(12) United States Patent
Monajemi et al.

(10) Patent No.: US 9,803,704 B1
(45) Date of Patent: Oct. 31, 2017

(54) SYSTEM AND METHOD FOR CONTROLLING VEHICLE COMPONENTS DURING A POWER DOWNSHIFT

(71) Applicant: GM GLOBAL TECHNOLOGY OPERATIONS LLC, Detroit, MI (US)

(72) Inventors: Dara Monajemi, Lansing, MI (US); Brian M Porto, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/251,646

(22) Filed: Aug. 30, 2016

(51) Int. Cl.
*B60W 10/06* (2006.01)
*F16D 48/06* (2006.01)
*B60W 10/115* (2012.01)

(52) U.S. Cl.
CPC .......... *F16D 48/06* (2013.01); *B60W 10/06* (2013.01); *B60W 10/115* (2013.01); *F16D 2500/104* (2013.01); *F16D 2500/30401* (2013.01); *F16D 2500/30814* (2013.01); *F16D 2500/50661* (2013.01)

(58) Field of Classification Search
None
See application file for complete search history.

(56) References Cited

U.S. PATENT DOCUMENTS

| | | | |
|---|---|---|---|
| 6,440,041 B1 * | 8/2002 | Riedle | B60W 10/06 |
| | | | 477/107 |
| 8,798,884 B2 | 8/2014 | Porto et al. | |
| 8,818,663 B2 | 8/2014 | Thor et al. | |
| 8,965,653 B2 | 2/2015 | Kokko et al. | |
| 9,140,359 B2 | 9/2015 | Porto et al. | |
| 9,162,680 B1 * | 10/2015 | Tseng | B60W 30/19 |
| 9,188,222 B2 * | 11/2015 | Monajemi | F16H 61/061 |
| 9,249,881 B1 | 2/2016 | Monajemi et al. | |

* cited by examiner

*Primary Examiner* — Dirk Wright
(74) *Attorney, Agent, or Firm* — General Motors LLC Legal Staff

(57) ABSTRACT

A transmission for a vehicle having a prime mover with an output shaft. The transmission includes an offgoing clutch that is selectively connected to the output shaft, and a controller in communication with the prime mover. The controller includes an offgoing clutch control module that determines an offgoing clutch torque profile at the start of a torque phase in a power downshift that does not exceed a predetermined offgoing clutch energy threshold and a torque request module that limits a rate of input torque into the transmission from the prime mover based upon the determined offgoing clutch torque profile.

20 Claims, 4 Drawing Sheets

SYSTEM AND METHOD FOR CONTROLLING VEHICLE COMPONENTS DURING A POWER DOWNSHIFT

FIELD

The present disclosure relates to a system and method that controls vehicle components during a power downshift.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

An automatic transmission includes gear elements and clutches that selectively couple input and output shafts of the transmission to establish a desired output speed ratio. Clutch engagement is typically achieved via a controlled application of fluid pressure. The applied fluid pressure moves a clutch piston from an initial position into engagement with a clutch pack. Shifting from one speed ratio to another is performed automatically by a transmission controller. The controller releases a clutch associated with the current speed ratio, i.e., the offgoing clutch, and applies a clutch associated with a desired new speed ratio, i.e., the oncoming clutch. Precise knowledge of various control values of the oncoming and offgoing clutches is essential to control and optimize feel of the shift event.

A power downshift is a shift from a higher gear to a lower gear while power is being demanded and applied to the transmission. In a power downshift, torque management is used to prevent the offgoing clutch energy from exceeding its predetermined maximum level and to minimize clutch wear and improve durability. Exceeding this maximum level may result in overheating of that clutch which may lead to its premature failure. Torque management is performed with reference to a series of calibration tables which are manually created through a tedious process. In a manual, iterative process, the desired torque level for each possible range of input torque for each possible downshift in a given transmission must be determined. Exemplary tables are illustrated in FIG. 2. A table must be manually created for each possible legal downshift in a gear box of a transmission. The table outputs a desired engine torque for each possible range of input torque according to turbine speed. The desired engine torque is then used to generate a torque request profile which is provided to an engine control module. The creation of these tables requires a significant amount of effort and time. Essentially, the tables are built by calibration processes which repeatedly "guess and check" values for each operating point in the table and running the corresponding shift to see if the corresponding clutch fails or otherwise degrades by more than an acceptable amount. If the clutch does fail or excessively degrades then the value in the table for the desired engine torque is replaced with a lower value and the process is repeated until a desired engine torque is arrived at which does not exceed the capacity of the clutch.

In some transmissions, torque management is not currently used because the clutches all have energy limits with plenty of capacity for all legal possible downshifts. Each of these power downshifts can take as long as desired and the energy capacity or limit for the offgoing clutches will not be exceeded. However, these transmissions may suffer from a problem where an error is introduced into the system. For example, a shift may go longer than desired which might cause an undesirably large amount of energy to be accumulated and applied to the offgoing clutch. This also may result in premature clutch wear and degrade performance of the clutch.

SUMMARY

In an exemplary aspect, a transmission for a vehicle having a prime mover with an output shaft. The transmission includes an offgoing clutch that is selectively connected to the output shaft, and a controller in communication with the prime mover. The controller includes an offgoing clutch control module that determines an offgoing clutch torque profile at the start of a torque phase in a power downshift that does not exceed a predetermined offgoing clutch energy threshold and a torque request module that limits a rate of input torque into the transmission from the prime mover based upon the determined offgoing clutch torque profile. In this manner, calibration tables are obviated which significantly reduces or eliminates the work required to create those tables. Further, premature wear and/or degraded performance of an offgoing clutch may be avoided.

In another aspect, the offgoing clutch control module is programmed to determine the offgoing clutch torque profile based upon a prediction of the offgoing clutch energy through the torque phase of the power downshift.

In another aspect, the offgoing clutch control module is programmed to determine the offgoing clutch torque profile based upon a total offgoing clutch energy by calculating an accumulated clutch energy through an inertia phase and the predicted total offgoing clutch energy through the torque phase.

In another aspect, the offgoing clutch control module determines an offgoing clutch torque profile at the start of the torque phase that does not exceed a predetermined offgoing clutch energy threshold by calculating a total offgoing clutch energy that does not exceed the predetermined offgoing clutch energy.

In another aspect, the offgoing clutch control module is programmed to determine the offgoing clutch profile by iteratively selecting a target near sync offgoing clutch torque.

In another aspect, the torque request module is programmed to determine a rate of input torque by generating a torque request profile based upon a desired engine torque.

In another aspect, the torque request module is programmed to determine the desired engine torque based upon the selected target near sync offgoing clutch torque.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
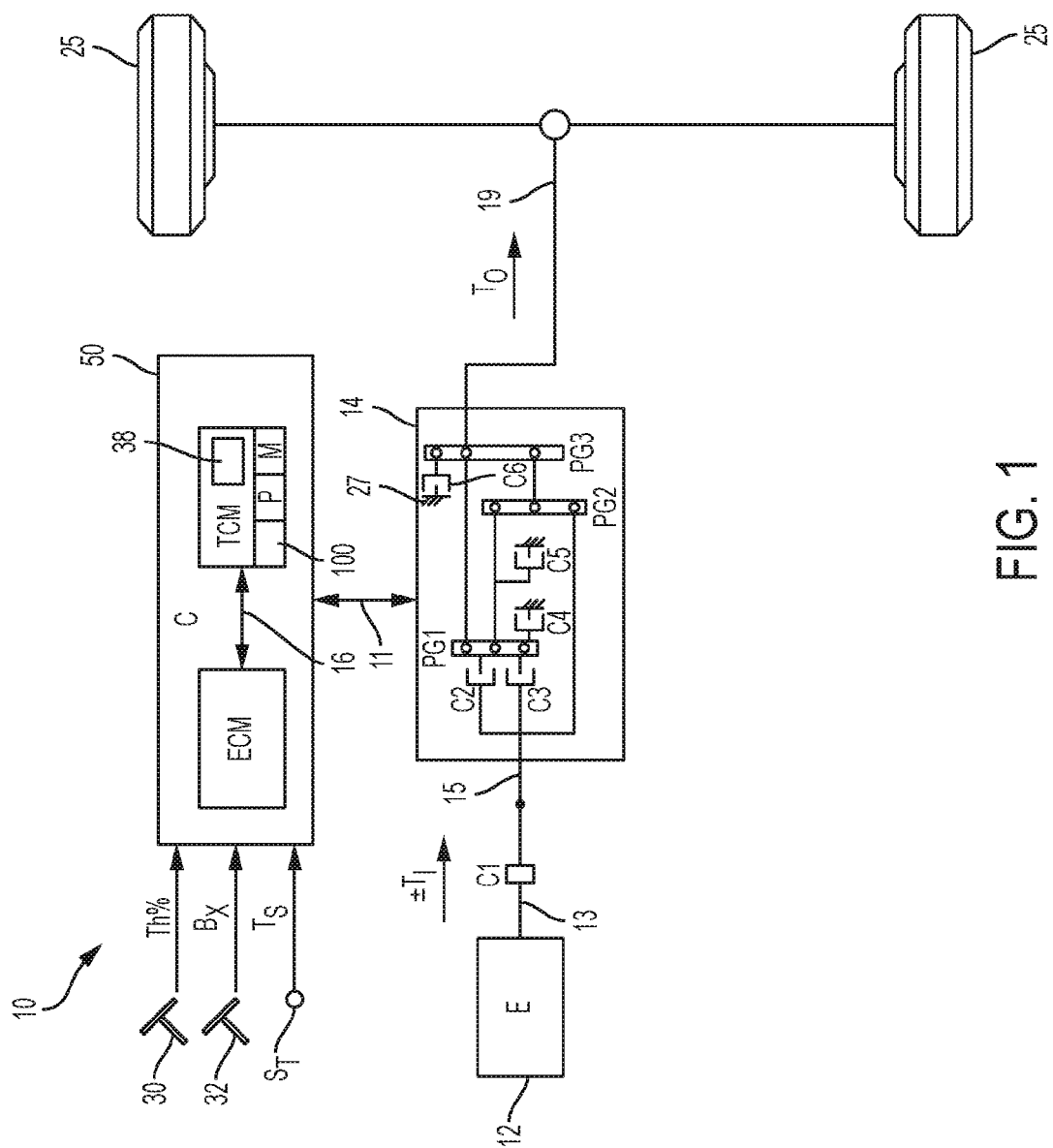
FIG. 1 is a schematic illustration of an exemplary vehicle having an automatic transmission and controller programmed to torque manage during a power downshift of the transmission.

Referring to FIG. 1, an example vehicle 10 includes a controller 50. The controller 50 is configured via the necessary hardware and associated software programming embodied as the control logic 400 of FIG. 4 to provide a transmission torque management system in accordance with an exemplary embodiment of this invention. The controller 50 may include an engine control module (ECM) and a transmission control module (TCM) in communication with each other, e.g., over a controller area network (CAN) bus 16 as shown, with the TCM being, in the non-limiting example of FIG. 1, the particular control module of the controller 50 that is programmed to execute the control logic 400.

The vehicle 10 of FIG. 1 may include a prime mover such as an internal combustion engine 12. The engine 12 is coupled to an automatic transmission 14 via an input clutch C1, for instance a hydrodynamic torque converter or a conventional friction clutch. The engine 12 may deliver positive or negative engine torque to the transmission 14 via an engine shaft 13 depending on control circumstances, from the engine 12 in different rotational directions. The engine shaft 13 is selectively connected to an input member 15 of the transmission 14. The transmission 14 also includes an output shaft 19 that ultimately conveys output torque to a set of drive wheels 25.

Within the exemplary transmission 14 of FIG. 1, multiple gear sets such as three gear sets PG1, PG2, and PG3 are selectively engaged via a set of friction clutches, for instance five clutches C1, C2, C3, C4, C5, via electro-hydraulic controls (not shown). The friction clutches C1-C5 are applied via fluid (not shown) that is circulated under pressure from a fluid pump and flow control valves (not shown) so as to connect nodes/members of the various gear sets PG1, PG2, PG3, together or to a stationary member 27 of the transmission 14. As is known in the art, the term "nodes" may encompass sun, ring, and carrier gear elements in a typical planetary gear configuration. The transmission 14 of FIG. 1 may be a multispeed transmission, for instance an 8-speed transmission, although the transmission 14 is not limited to such an embodiment.

Figure 4:
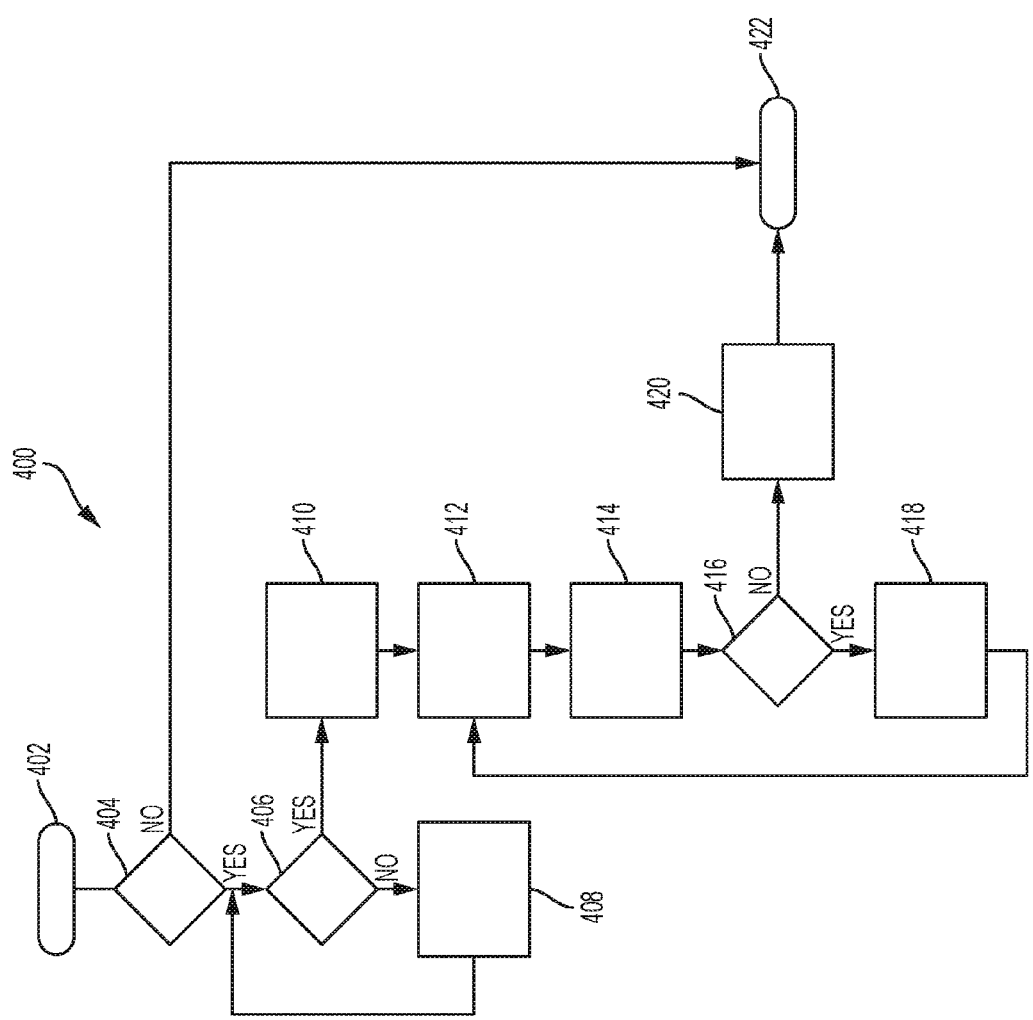
FIG. 4 is a flowchart of a method in accordance with an exemplary embodiment of the invention.

The controller 50 of FIG. 1 selectively executes the control logic 400, an example of which is shown in FIG. 4, by executing, during a power downshift of the vehicle 10 via a processor P, associated computer code or instructions. Such instructions may be pre-recorded on tangible, non-transitory memory M. Inputs to the controller 50 may include a throttle level from a throttle input device 30, such as an accelerator pedal, a braking level from a brake pedal 32, a fluid sump temperature sensor ST and/or the like without limitation.

The controller 50 may be configured as a microprocessor based computing device having such common elements as the processor P and memory M, the latter including tangible, non-transitory memory devices or media, without limitation. The controller 50 may also include any required logic circuitry. The controller 50 is programmed, among other things, to execute a power down shift torque management as disclosed herein, and to control the transmission 14 and engine 12.

Figure 3:
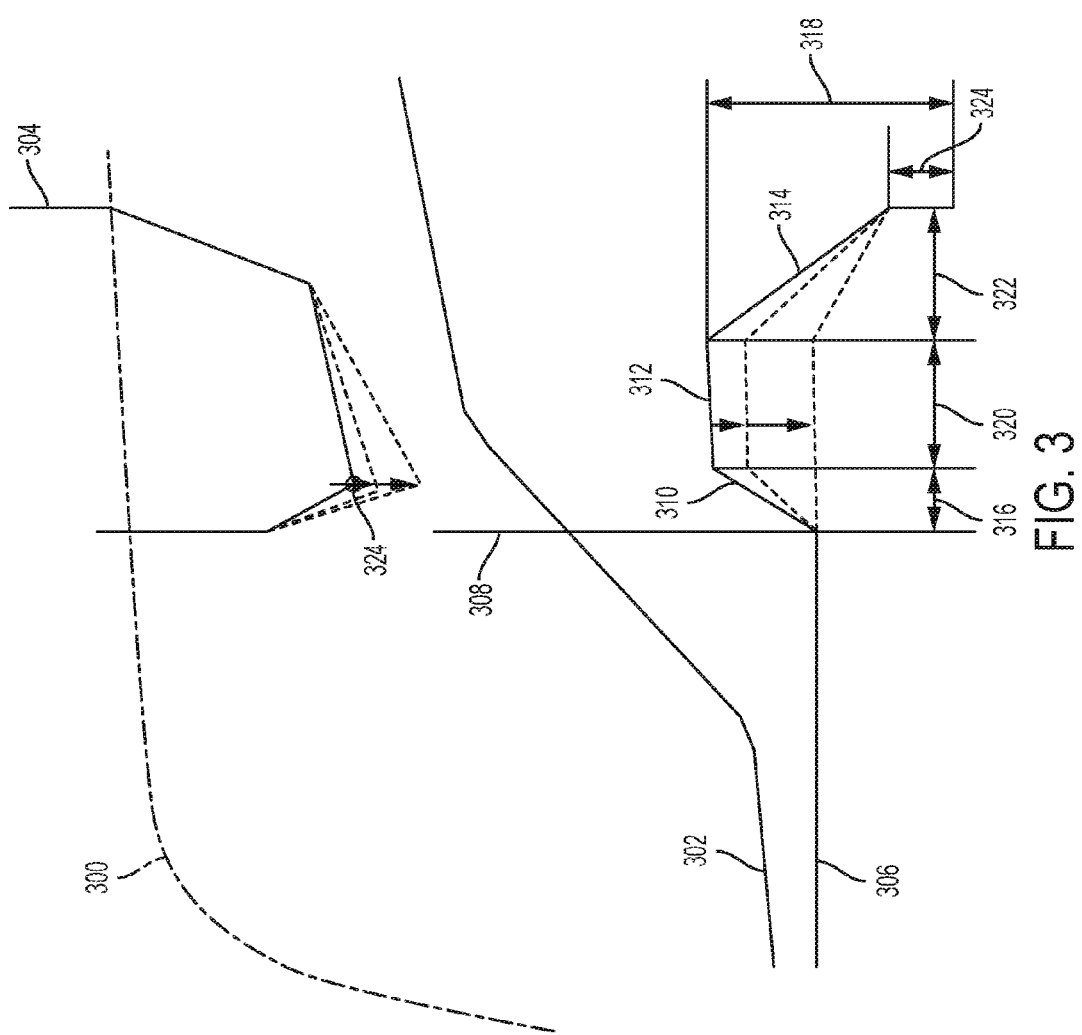
FIG. 3 illustrates signal traces of a transmission torque management system.

FIG. 3 illustrates signal traces of a transmission torque management system with time elapsing while moving from left to right in the figure. Signal line 300 illustrates the driver demand for input torque. The driver demand for torque 300 increases which prompts the transmission to initiate a power downshift process. The turbine speed is illustrated by signal line 302, a torque request profile is illustrated by signal line 304, and a clutch torque profile is illustrated with signal line 306. The torque request profile 304 represents the torque request signal that is sent to the engine control module to control the amount of torque from the engine being input into the transmission. The clutch torque profile 306 illustrates the amount of torque being commanded to the offgoing clutch during the downshift.

The main shifting element in a power downshift is the offgoing clutch and the offgoing clutch is released according to a prescribed profile. The process starts by permitting the offgoing clutch to slip without completely allowing the offgoing clutch to fully release. Through the profile, the clutch is staged such that the ratio change may occur. Near the end of the ratio change is where a handoff to the oncoming clutch may occur. The ratio change includes two phases: an inertia phase and a torque phase. The inertia phase ends at time line 308 where the torque phase starts. The inertia phase is where turbine speed change happens and the torque phase is where the torque transfer between the two clutches happens.

Torque management in a power downshift starts at or near the start of the torque phase to avoid slowing down the speed change. Torque management can have the effect of slowing the speed change which might undesirably have the effect of extending the time of the shift event. Thus, torque management is initiated at or near the end of the speed change. When the turbine speed becomes stable at the target gear ratio speed is where the ratio change is complete, thus, as the turbine speed approaches the target gear ratio speed the torque phase is entered.

Torque management works by reducing the amount of torque being provided by the engine, which results in less torque being applied to the clutch and which results in an overall reduction in the amount energy on the offgoing clutch. This is illustrated by the following equation:

$$E_{clutch} = \int_{ti}^{tf}(t \cdot n) \cdot dt \qquad (1)$$

Where $E_{clutch}$ is the total clutch energy, t is the torque carried by the clutch, and n is the slip speed of the clutch. So, a lower engine torque results in lower clutch torque which means less energy on the clutch. Each clutch in the transmission may be limited by the amount energy applied to that clutch before the clutch may fail, excessively wear, overheat, or slip. Exceeding this energy limit may also cause the offgoing clutch to slip so much that the speed of the turbine may continue to accelerate uncontrollably or to "flare away."

Figure 2:
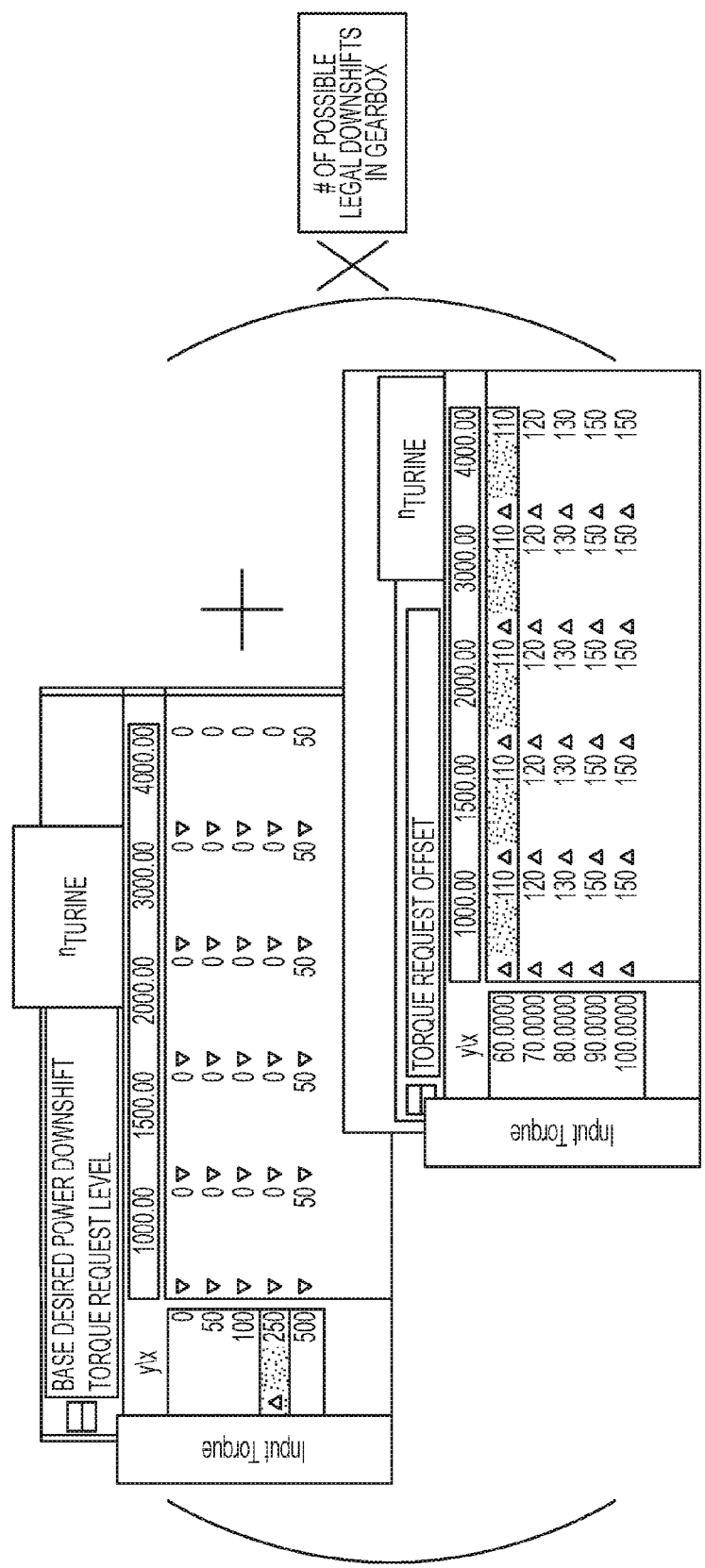
FIG. 2 illustrates exemplary calibration tables for a torque management method.

As explained above, a current method of torque management may rely upon clutch tables, examples of which are illustrated by FIG. 2, which have no comprehension of the amount of energy being applied to the offgoing clutch and require a very high amount of effort to accumulate the values necessary for every operating point in every possible legal shift for any given transmission. In stark contrast, the present invention obviates the necessity of these tables and the large workload associated in creating them. For example, in a nine or ten speed automatic transmission, there may be over thirty different downshift possibilities and a table is required for each of these downshifts which each need to cover all possible ranges of input torque and turbine speeds at a reasonably fine granularity.

An exemplary embodiment of the invention predicts how much energy will be on the offgoing clutch throughout the entire shift event and, if that energy might exceed a predetermined threshold, the clutch torque profile is revised using lower torque request profiles until the predicted energy does not exceed the threshold. That new clutch torque profile is used to calculate a desired engine torque with which an engine torque request profile may be generated and forwarded to the engine controller.

The present invention also provides advantages for those transmissions where torque management is not currently used because the clutches in those transmissions all have energy limits with plenty of capacity for all legal possible downshifts. As explained above, each of these power downshifts can take as long as desired and the energy capacity or limit for the offgoing clutches will not be exceeded, unless an error is introduced into the system which causes the shift to go too long and accumulate a large amount of energy which might exceed the energy limit of an offgoing clutch. The present invention provides protection against this because it accounts for clutch slip and the amount of time for the ratio change. Thus, the invention serves as a hardware protection benefit even for those transmissions which do want to use or which do not use torque management.

The operation of the method in accordance with an exemplary embodiment of the invention may be understood with reference to the flowchart of FIG. 4 and illustration of signal lines in FIG. 3 and the following description. The method 400 starts at step 402 and continues to step 404 where the system determines whether a power downshift is occurring. If in step 404 the system determines that a power downshift is not happening then the system jumps to step 422 where the method ends. Alternatively, if in step 404, the system determines that a power downshift is requested, then the method continues to step 406. In step 406, the method determines whether to start the torque phase. The torque phase is started when the estimated time to synchronization for the turbine speed with the target gear ratio speed is below a calibrated level. For example, once the turbine speed reaches 90% of the target gear ratio speed, then the method decides to start the torque phase. This is generally done using an acceleration based method whereby if the turbine speed is increasing at a linear rate, then the timer will linearly decrease and the torque phase is entered when the time remaining is lower than a predetermined amount.

If, in step 406, the method determines that the torque phase is not started, then we remain in the inertia phase and the method continues to step 408 where the method calculates the energy accumulated by the offgoing clutch. The method relies upon equation (1) above to continuously update and calculate the accumulated energy. The method then returns to step 406.

If, however, in step 406, the method determines that the torque phase is starting, then the method proceeds to step 410. In step 410, the method generates a clutch slip speed profile. The clutch speed profile may be assumed to be linear and may be generated using the following equation:

$$n_f = n_i + \alpha \cdot t \quad (2)$$

Where: $n_f$ is the final clutch slip speed, $n_i$ is the clutch slip speed at the start of the torque phase, $\alpha$ is the rate of the clutch slip increasing during the inertia phase, and t is the time until synchronization. The method then continues to step 412.

In step 412, the method generates a clutch torque profile. Referring back now to FIG. 3, the construction of the clutch torque profile 306 may be explained. There are three parts to the clutch torque profile in the torque phase: a near sync boost 310, a near sync hold 312, and a torque phase ramp out 314. The clutch torque profile 306 may be generated with reference to five values: a calibrated near sync boost ramp time 316, a calculated target near sync offgoing clutch torque 318, an estimated near sync hold time 320, a calibrated offgoing ramp out time 322, and a calibrated offgoing destroke level 324. All of these values are predetermined or estimated, except for the calculated target near sync offgoing clutch torque 318. The initial calculated target near sync offgoing clutch torque 318 is determined using the following equation:

$$T_{OffgClch} = R_{c\_Offg} \cdot \left( T_E - I_E \cdot a_E + (TR - 1) \cdot \left(\frac{N_E}{K}\right)^2 - (I_{TC\_t} + I_{Trans\_In}) \cdot a_t \right) \quad (3)$$

Where: $T_E$ is engine torque, $T_{OffgClch}$ is the target near sync offgoing clutch torque, $I_E$ is engine inertia, $\alpha_E$ is engine acceleration, $R_{c\_Offg}$ is offgoing clutch lever ratio, TR is converter torque ratio, $I_{TC\_t}$ is turbine inertia, $I_{Trans\_In}$ is transmission input inertia, $\alpha_t$ is turbine acceleration, $N_e$ is engine speed, and K is the converter characterization factor. The engine acceleration $\alpha_E$ and turbine acceleration $\alpha_t$ are both set to filtered turbine acceleration.

The method next continues to step 414, where the total offgoing clutch energy through the entire downshift is predicted. The method takes the total accumulated offgoing clutch energy from step 408 and adds the value predicted using equation (1) above and the generated clutch slip speed profile and the generated clutch torque profile from steps 410 and 412. The method then continues to step 416.

In step 416, the method determines whether the total predicted offgoing clutch energy calculated in step 414 exceeds a threshold value for the corresponding offgoing clutch. If that value exceeds the threshold, the method continues to step 418.

In step 418, the method reduces the target near sync offgoing clutch torque 318 to a value between the previous value and a minimum clutch torque value. A minimum clutch torque value is a clutch torque which is so low as to potentially lose control over the slip speed and/or turbine speed such that the turbine speed might continue to increase or accelerate. The new value for the target near sync offgoing clutch torque 318 may be arrived at using any known solver or searching algorithm such as the bisection method, for example, without limitation. Once the target near sync offgoing clutch torque 318 is reduced the method returns to step 412, where a new clutch torque profile is generated using the new lower target near sync offgoing clutch torque 318, a new total clutch energy is predicted in step 414 and compared with the threshold in step 416. This iterative process continues until in step 416, the predicted total clutch energy is lower than the threshold.

Once the predicted total clutch energy is lower than the threshold, the method continues from step 416 to step 420. In step 420, the method calculates a desired engine torque request using the following equation:

$$T_{E\_Desired} = \frac{T_{OffgClch}}{R_{c\_Offg}} + I_E \cdot a_E - (TR-1) \cdot \left(\frac{N_E}{K}\right)^2 + (I_{TC\_t} + I_{Trans\_In}) \cdot a_t \quad (4)$$

Where: $T_{E\_Desired}$ is desired engine torque, $T_{OffgClch}$ is the target near sync offgoing clutch torque, $I_E$ is engine inertia, αE is engine acceleration, $R_{c\_Offg}$ is offgoing clutch lever ratio, TR is converter torque ratio, $I_{TC\_t}$ is turbine inertia, $I_{Trans\_In}$ is transmission input inertia, at is desired turbine acceleration, $N_e$ is engine speed, and K is the converter characterization factor. All of the values in the above equation are well understood and only the value for the target near sync offgoing clutch torque is calculated during steps 412 and/or 418. The desired engine torque is represented in FIG. 2 as point 324 and is used to generate a torque request profile 304 as is well understood by those of ordinary skill in the art.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle comprising:
   a prime mover having an output shaft;
   an offgoing clutch that is selectively connected to the output shaft;
   a controller in communication with the prime mover, the controller including:
      an offgoing clutch control module programmed to determine an offgoing clutch torque profile at the start of a torque phase in a power downshift that does not exceed a predetermined offgoing clutch energy threshold; and
      a torque request module programmed to limit a rate of input torque into the transmission from the prime mover.

2. The vehicle of claim 1, wherein the offgoing clutch control module is programmed to determine the offgoing clutch torque profile based upon a prediction of the offgoing clutch energy through the torque phase of the power downshift.

3. The vehicle of claim 2, wherein the offgoing clutch control module is programmed to determine the offgoing clutch torque profile based upon a total offgoing clutch energy by calculating an accumulated clutch energy through an inertia phase and the predicted total offgoing clutch energy through the torque phase.

4. The vehicle of claim 3, wherein the offgoing clutch control module determines an offgoing clutch torque profile at the start of the torque phase that does not exceed a predetermined offgoing clutch energy threshold by calculating a total offgoing clutch energy that does not exceed the predetermined offgoing clutch energy.

5. The vehicle of claim 2, wherein the offgoing clutch control module is programmed to determine the offgoing clutch profile by iteratively selecting a target near sync offgoing clutch torque.

6. The vehicle of claim 5, wherein the torque request module is programmed to determine a rate of input torque by generating a torque request profile based upon a desired engine torque.

7. The vehicle of claim 6, wherein the torque request module is programmed to determine the desired engine torque based upon the selected target near sync offgoing clutch torque.

8. A transmission for a vehicle having a prime mover with an output shaft, the transmission comprising:
   an offgoing clutch that is selectively connected to the output shaft;
   a controller in communication with the prime mover, the controller including:
      an offgoing clutch control module programmed to determine an offgoing clutch torque profile at the start of a torque phase in a power downshift that does not exceed a predetermined offgoing clutch energy threshold; and
      a torque request module programmed to limit a rate of input torque into the transmission from the prime mover based upon the determined offgoing clutch torque profile.

9. The transmission of claim 7, wherein the offgoing clutch control module is programmed to determine the offgoing clutch torque profile based upon a prediction of the offgoing clutch energy through the torque phase of the power downshift.

10. The transmission of claim 9, wherein the offgoing clutch control module is programmed to determine the offgoing clutch torque profile based upon a total offgoing clutch energy by calculating an accumulated clutch energy through an inertia phase and the predicted total offgoing clutch energy through the torque phase.

11. The transmission of claim 10, wherein the offgoing clutch control module determines an offgoing clutch torque profile at the start of the torque phase that does not exceed a predetermined offgoing clutch energy threshold by calculating a total offgoing clutch energy that does not exceed the predetermined offgoing clutch energy.

12. The transmission of claim 9, wherein the offgoing clutch control module is programmed to determine the offgoing clutch profile by iteratively selecting a target near sync offgoing clutch torque.

13. The transmission of claim 12, wherein the torque request module is programmed to determine a rate of input torque by generating a torque request profile based upon a desired engine torque.

14. The transmission of claim 13, wherein the torque request module is programmed to determine the desired engine torque based upon the selected target near sync offgoing clutch torque.

15. A method for controlling a power downshift in a vehicle having a prime mover with an output shaft, a transmission having a clutch that acts as an offgoing clutch during the power downshift, and a controller, the method comprising:
   determining an offgoing clutch torque profile at the start of a torque phase in the power downshift that does not exceed a predetermined offgoing clutch energy threshold; and
   limiting a rate of input torque into the transmission from the prime mover based upon the determined offgoing clutch torque profile.

16. The method of claim 15, wherein determining the offgoing clutch torque profile comprises predicting an offgoing clutch energy through the torque phase of the power downshift.

17. The method of claim 16, further comprising calculating an accumulated clutch energy through an inertia phase of the power downshift and wherein determining the offgoing clutch torque profile comprises determining a total offgoing clutch energy that is the total of the accumulated clutch energy through the inertia phase and the predicted offgoing clutch energy through the torque phase.

18. The method of claim 15, wherein determining the offgoing clutch profile comprises iteratively selecting a target near sync offgoing clutch torque.

19. The method of claim 17, wherein limiting a rate of input torque into the transmission comprises generating a torque request profile based upon a desired engine torque.

20. The method of claim 17, further comprising determining the desired engine torque based upon the selected target near sync offgoing clutch torque.

\* \* \* \* \*